3,276,284
SCREW AND NUT DEVICES FOR CONTROLLING THE MOVEMENTS OF MACHINE COMPONENTS
Albert Rinck, Annemasse, France, assignor to Societe Anonyme dite: Gambin S.A., Viuz-en-Sallaz, Haute-Savoie, France
Filed Apr. 27, 1964, Ser. No. 362,901
Claims priority, application France, May 2, 1963, 933,367, Patent 1,363,367
1 Claim. (Cl. 74—424.8)

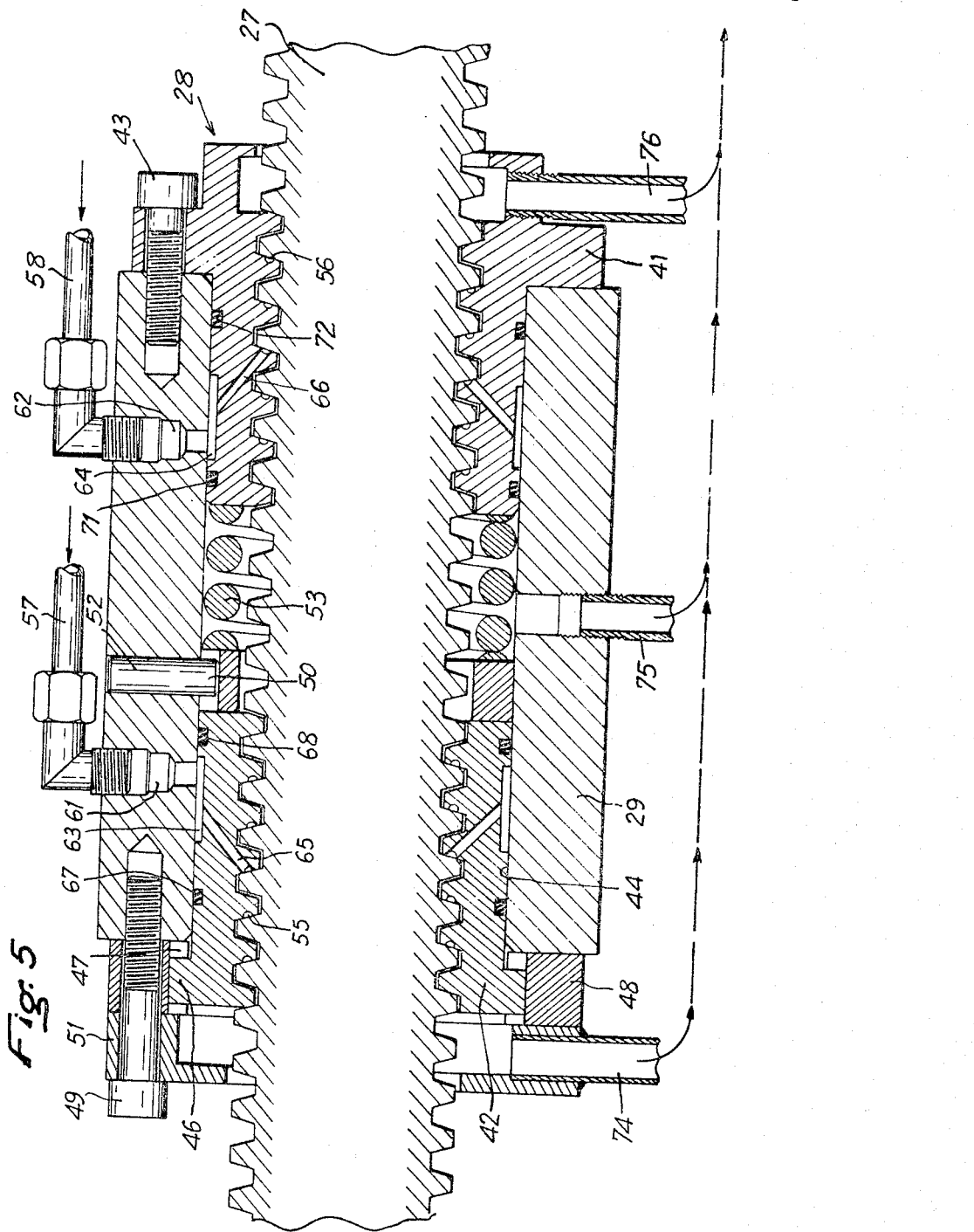

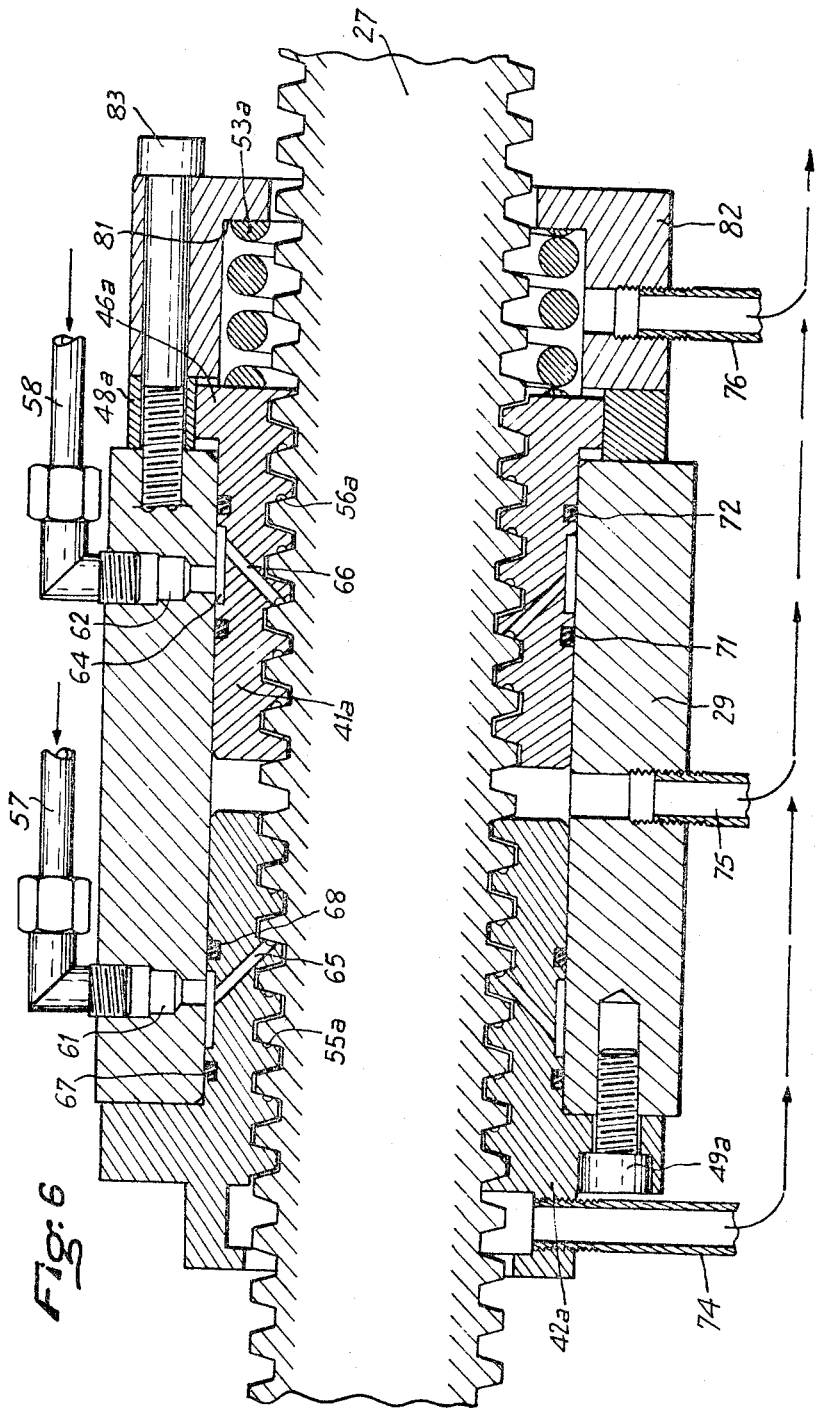

The present invention relates to devices of the screw and nut type for controlling the movements of machine components and is especially although not exclusively concerned with devices of the type which serve to control the feed-motion of machine-tool components.

In order to improve the lubrication of the threads of devices of this type, it has already been proposed to provide the flanks of the threads of the screw and/or nut with a groove which follows the helical configuration of the thread along the whole of its length around the core of the screw.

However, these devices have not yet proved fully satisfactory. In fact, in the stationary position and under the action of the load which is carried by the flanks of the threads and which may attain a very high value in modern machine-tools of large size, the pressure exerted by the flanks of the screw threads against the flanks of the nut threads is liable to drive the oil away from the contact surfaces with the result that these latter are applied directly against each other and thus create a direct metal to metal contact. Under these conditions, the starting of the device calls for a substantial torque with attendant danger of local friction or seizure of such nature as to cause gradual impairment of the threads and a reduction in the precision of the machine.

The object of the invention is to provide a control device of the screw and nut type which is not subject to the disadvantage noted above in reference to devices of the prior art.

To this end, according to the present invention, the lubricating groove is formed solely in the threads of the nut, at least in one of the two flanks of the said threads and terminates at a predetermined distance from each end of the said nut, the aforesaid groove being additionally in communication with ducts which are intended to be supplied with oil at a suitable pressure.

Very good results have been obtained by supplying the said ducts at a pressure which is such that the relative axial thrust produced between the screw and the nut under the action of the oil pressure is slightly lower than the axial load which is carried by the threads and which results from the opposing mechanical effort.

The unitary resultant pressure between the thread flanks of the screw and of the nut is in that case not sufficient to produce a rupture of the oil film between the said thread flanks. The device which is thus designed provides very smooth operation and calls for a very low torque even at starting, and is thereby endowed with high precision, permits of easy and rapid operation and is practically not subject to wear.

In the screw-and-nut operating devices which are intended to work in both directions, each of the two thread flanks of the nut has an oil-injection groove.

The system in accordance with the invention is of particular interest in feed-motion devices comprising two nuts which are movable axially with respect to each other for the purpose of taking up the play of the assembly as a whole since, in this case, the area of friction surfaces is substantialy twice the area of friction surfaces in systems having only a single nut.

In one embodiment in which the two nuts are urged elastically away from each other in the axial direction and consequently in which one of the thread-flanks of one nut bears against the threads of the screw whilst in the other nut it is the other thread flank which is applied against the screw-threads, the oil-injection groove is formed in the said thread flanks of the nut.

These and other objects of the invention will become apparent from the following description, taken in connection with the accompanying drawings in which:

FIG. 5 is a detail cross-section on a larger scale and taken along the line V—V of FIG. 1, and FIG. 6 shows an alternative form of the device of FIG. 5.

Figure 1:
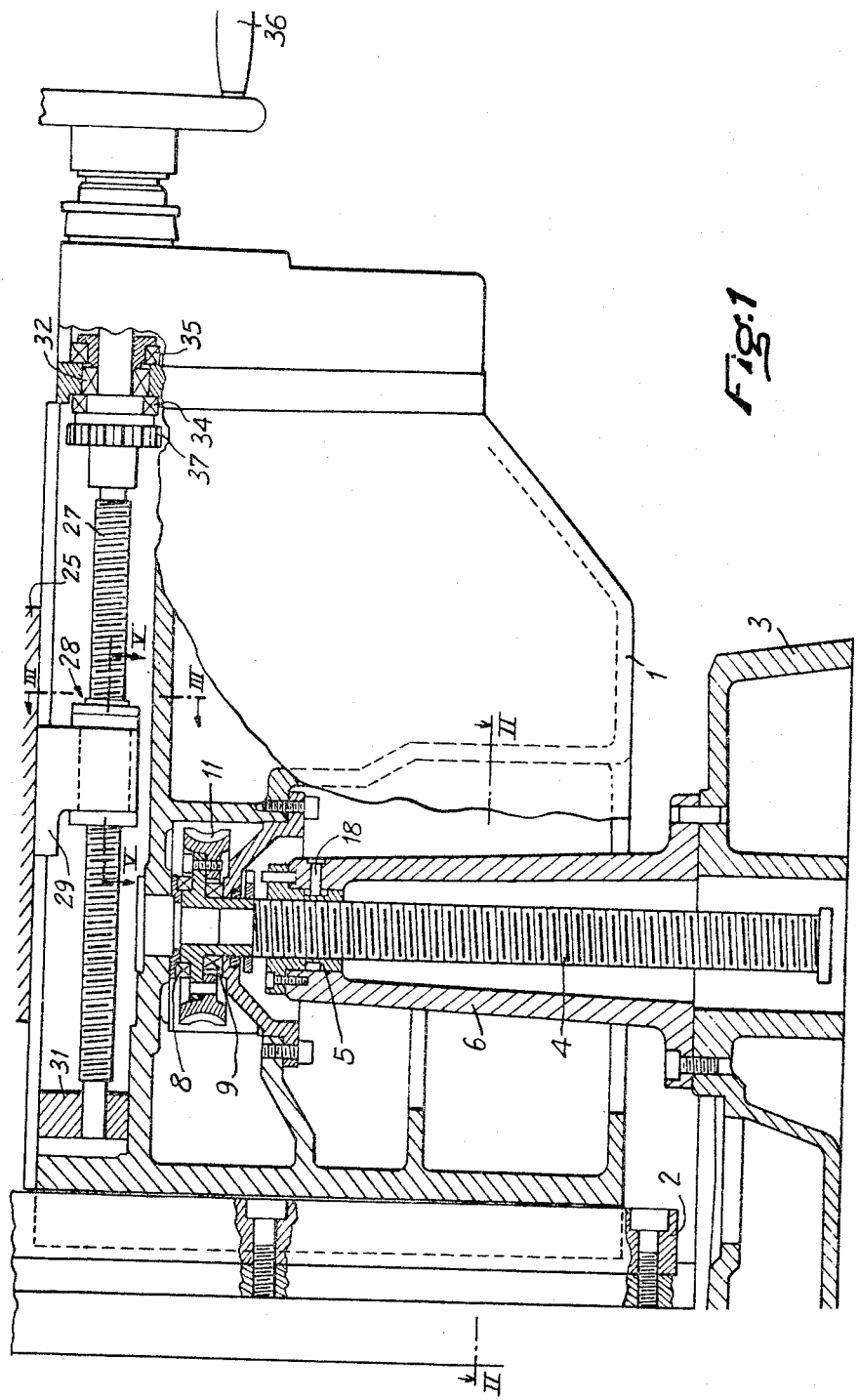
FIG. 1 illustrates diagrammatically in vertical cross-section the screw and nut devices for controlling the vertical movements of a knee and the horizontal movements of the table-carrying saddle of a milling machine.
Figure 2:
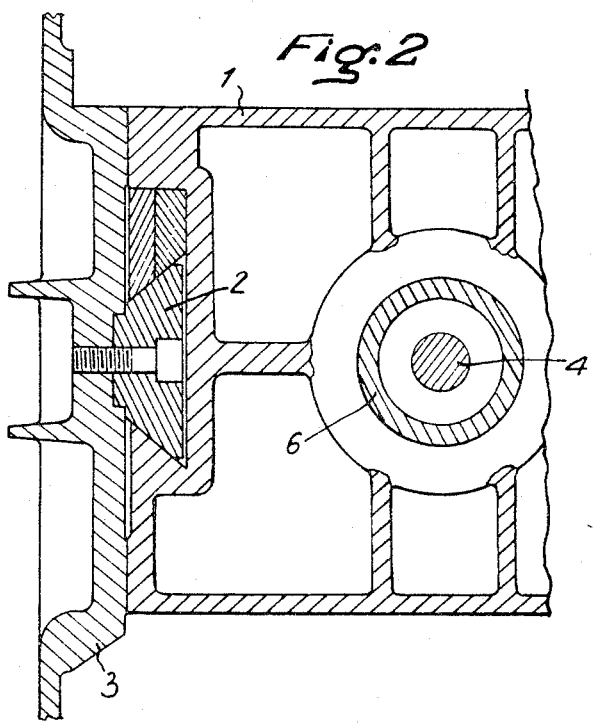
FIG. 2 is a horizontal cross-section taken along the line II—II of FIG. 1.

The device for controlling the vertical movements of the knee 1 (as shown in FIGS. 1 and 2) on the vertical slide 2 of the frame 3 of a milling machine comprises a vertical screw 4 which is coupled axially with the said knee and engaged in a nut 5 which is mounted in the upper end of a column 6 which is secured to the frame 3 of the machine.

The coupling of the screw 4 relatively to the knee 1 in the axial direction is effected by means of any conventional device of suitable type such as the system comprising two ball thrust bearings 8, 9 which are imprisoned between two walls forming part of the knee 1 and between which is clamped the hub of a wheel 11 which is integral with the screw 4 and adapted to be driven by a worm (not shown). The said worm can be driven in rotation by means which have not been illustrated in the drawings and which comprise a manual control and an automatic control following the practice which is customarily adopted in this type of machine.

In FIG. 4, there is again shown on a larger scale the upper portion of the vertical screw 4 and the nut 5 in which the said screw is fitted. The weight of the knee 1 and of all the components carried thereon as well as the weight of the part to be machined exert on the screw 4 (which, in the final analysis, carries the entire load) a downwardly-directed vertical effort which has the effect of applying the bottom flanks of the threads of the screw 4 against the top flanks of the threads of the nut 5.

The helical groove 12 is accordingly formed in the top flanks of the threads of the nut 5. The said groove does not have opening at the extremities of the nut but, on the contrary, stops at a certain distance short of the said extremities.

The groove 12 is supplied with oil under pressure from any suitable source by means of ducts such as the duct 14 which open at one end in the said groove and at the other end in an annular chamber 15 of the external cylindrical surface of the nut 5, the said annular chamber being limited by the corresponding portion of the bore 16 of the upper extremity of the column 6 in which the said nut is mounted. The annular chamber 15 is in communication with a radial duct 18 formed in the top portion of the column at the level of the said annular chamber. The said radial duct is connected to a pipe 19 which is in turn connected to the source of oil under pressure.

Two O-ring seals 21, 22 which are fitted in corresponding annular grooves of the external cylindrical surface of the nut 5 complete the fluid-tightness of the said screw within the column.

The oil pressure which is adopted should be such that the resultant force which is directed up onto the threads of the screw is smaller than the load carried by this latter in order to ensure that the bottom thread flanks of the screw are not separated from the top thread flanks of the nut, as this would create a substantial oil leakage and an accompanying drop in pressure which would be entirely contrary to the result which it is sought to achieve.

By virtue of this particular arrangement, in view of the fact that the helical groove 12 of the top flank of the nut thread does not have any opening at the ends of the nut, the pressure of oil admitted within the said groove is maintained, with the result that, even at the time of starting, the movement of rotation of the screw is very smooth. Moreover, the oil film is constantly maintained between the corresponding threads of the screw and of the nut, so that any grinding, abrasion or seizure is thus prevented and wear is reduced practically to zero, thus enabling the machine to retain a high degree of precision.

The system which has been described above offers an additional advantage in that it requires a very low starting torque, with the result that if it is desired, for example, to effect a slight feed by hand, it is not necessary to exert a substantial effort and the screw can be rotated through any angle, however small.

Figure 3:
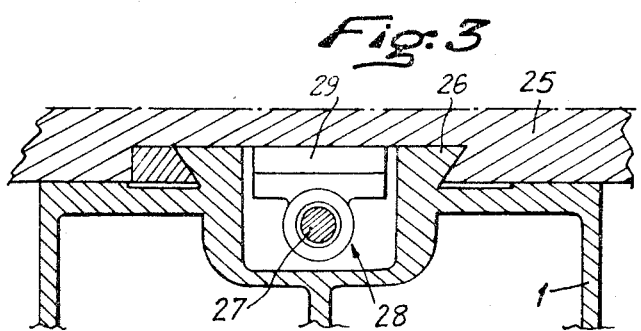
FIG. 3 is a cross-section taken along the line III—III of FIG. 1.

In FIGS. 1 and 3, there is also shown diagrammatically the device for controlling the feed motion of the saddle 25 which carries the table (not shown) on which the workpiece to be machined is placed and secured, the said saddle 25 being movable on dovetail slideways 26 which are integral with the top face of the knee 1, the feed motion being carried out by a lead-screw 27 which is positioned axially within the knee and which is engaged with a nut having the general reference 28, the said nut being mounted in a support 29 which is integral with the underface of the saddle 25.

The screw 27 is carried at both ends in two bearings 31, 32 respectively which are integral with the knee 1 and the axial positioning thereof is ensured by means of two ball thrust bearings 34, 35. The screw 27 can be driven either manually by means of a crank-handle 36 or mechanically by means of a system of gears driving a toothed wheel 37 which is integral with the said screw.

In FIG. 5, there has been represented in detail on a larger scale the feed-screw and nut assembly 28 of FIG. 1.

In the example, the aforesaid assembly comprises an automatic device for taking up wear and, to this end, the screw 27 is engaged within two separate nuts 41, 42 which are mounted in the support 29, the nut 41 being made integral with the support 29 by means of screws 43 whilst the nut 42 is capable of sliding axially within the bore 44 of the support 29 without rotating relatively to the said support by virtue of the cooperation of a splined annular flange 46 which forms part of the said nut and which is adapted to cooperate with corresponding splines 47 formed in the bore of a ring 48 which is secured to the corresponding extremity of the support 29 by means of screws 49 which also hold in position an annular closure plate 51.

The thickness of the ring 48 is greater than the thickness of the annular flange 46 so as to permit a certain longitudinal displacement of the nut 42 within the support 29.

The nut 42 is urged axially away from the nut 41 by a helical spring 53, the two ends of which are respectively applied against the oppositely facing ends of the two nuts. A ring 50 which is secured only against rotation by means of a lug 52 is interposed between the nut 42 and the spring 53 in order that this latter should not rub against the said nut at the time of assembly.

The strength of the spring 53 is greater than the reaction of the threads of the screw on the threads of the nut during the movements of the saddle. The left-hand thread-flanks of the nut 42 bear against the right-hand thread-flanks of the screw, and the right-hand thread-flanks of the nut 41 bear against the left-hand thread-flanks of the said screw. The lubricating groove 55 is therefore formed in the left-hand thread-flanks of the nut 42 whilst the lubricating groove 56 of the nut 41 is formed in the right-hand thread-flanks of the said nut.

Figure 4:
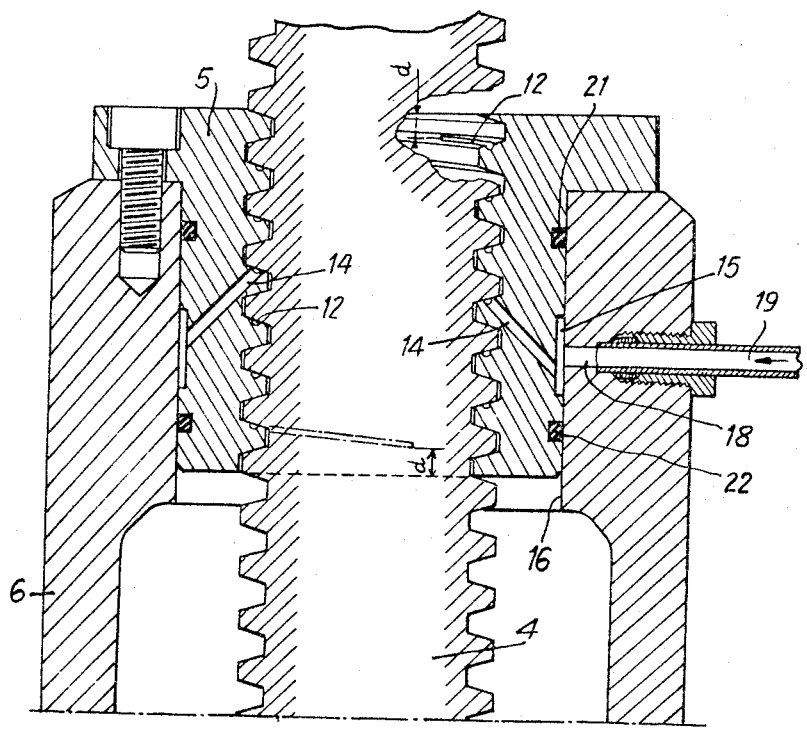
FIG. 4 shows on a larger scale the structural detail of the nut of the system for controlling the vertical movements of the knee.

The grooves 55, 56, as in the embodiment of the nut of FIG. 4, stop at a certain distance short of each of the corresponding nut and are supplied respectively through pipes 57, 58 and ducts 61, 62 of the annular chambers 63, 64 which are formed within the nuts, and through ducts 65, 66 which have their openings in the said helical grooves.

O-ring seals 67, 68 and 71, 72 ensure the fluid-tightness of the nuts within the bore 44 of the support.

Possible oil leakage through the ends of the nuts is collected by pipes 74, 75, 76 which convey the oil to a collector-tank (not shown).

The device is intended to transmit efforts equally in one direction or in the other and the same thread-flanks are maintained in contact in both cases by virtue of the presence of the spring 53 for taking up play. As in the embodiment which has been described earlier, the oil under pressure which is injected into the grooves of the thread-flanks of the nuts ensures excellent operation of the device.

The alternative embodiment which is illustrated in FIG. 6 differs from the embodiment of FIG. 5 only in that the spring 53a for taking up play, instead of being interposed between the two nuts is disposed between the outer extremity of the nut 41a which is in this case capable of moving axially and the internal shoulder 81 of an end-piece 82 which is secured against the support 29 by means of screws 83. The same reference numerals as those which are employed in the embodiment of FIG. 5 have been retained for the purpose of designating corresponding parts but are in this case followed by the index a. In this alternative form, the right-hand thread-flanks of the nut 42a bear against the left-hand thread-flanks of the screw whilst the left-hand thread-flanks of the nut 41a bear against the right-hand thread-flanks of the lead-screw 27, but the operation is similar.

It will be readily understood that the invention is not limited to the forms of embodiment which have been described and illustrated and that a large number of modifications can be made therein depending on the applications which are contemplated without thereby departing either from the scope or the spirit of the invention.

It accordingly follows, for example, that provision could be made for annular lubricating grooves on both flanks of each thread of a feed-control nut. A lubricating groove of similar design could also be formed in the threads of a nut of a feed-control device in which the screw is stationary whilst the nut is in that case driven in rotation.

Grooves for injecting oil under pressure could also be provided in both flanks of the threads of a nut in a device which is intended to work in both directions and which would comprise only a single nut instead of two nuts which are urged elastically relative to each other in the axial direction for the purpose of taking up play as in the forms of embodiment hereinbefore described.

What I claim is:

Screw and nut device for controlling the movements of machine components, and which device is of the type wherein a lubricating groove is formed in the thread flanks and follows the helical configuration of the thread around the axis of the member on which the said thread is formed, characterized in that only the thread of the nut has said lubricating groove formed therein in at least one flank of said thread, said groove terminating at a predetermined distance from each extremity of said nut, said nut also having ducts therein in communication with said groove and said groove receiving oil via said ducts under a pressure such that the relative axial thrust produced between the screw and the nut under the action of the oil pressure is slightly lower than the axial load which is carried by the threads and which results from the opposing mechanical forces.

References Cited by the Examiner

UNITED STATES PATENTS 2,320,353 6/1943 Ernst et al. _____ 74—467 X

FOREIGN PATENTS 666,529 7/1963 Canada.

DAVID J. WILLIAMOWSKY, Primary Examiner.

L. H. GERIN, Assistant Examiner.